(12) United States Patent
Song et al.

(10) Patent No.: US 11,046,794 B2
(45) Date of Patent: Jun. 29, 2021

(54) SCALE INHIBITOR COMPOSITIONS AND METHODS OF USING

(71) Applicant: Cytec Industries Inc, Princeton, NJ (US)

(72) Inventors: Airong Song, Larchmont, NY (US); Lei Zhang, Stamford, CT (US); Douglas Cywar, Danbury, CT (US); Haunn-Lin Tony Chen, Morganville, NJ (US); Matthew Taylor, Wilton, CT (US)

(73) Assignee: Cytec Industries Inc., Princeton, NJ (US)

( * ) Notice: Subject to any disclaimer, the term of this patent is extended or adjusted under 35 U.S.C. 154(b) by 522 days.

(21) Appl. No.: 14/969,918

(22) Filed: Dec. 15, 2015

(65) Prior Publication Data

US 2016/0176995 A1    Jun. 23, 2016

Related U.S. Application Data

(60) Provisional application No. 62/092,950, filed on Dec. 17, 2014.

(51) Int. Cl.

| | |
|---|---|
| *C08F 126/02* | (2006.01) |
| *C02F 5/10* | (2006.01) |
| *C08F 8/42* | (2006.01) |
| *C02F 5/12* | (2006.01) |
| *C08F 130/08* | (2006.01) |
| *C02F 1/68* | (2006.01) |
| *C08F 226/02* | (2006.01) |
| *C08L 37/00* | (2006.01) |
| *C02F 103/02* | (2006.01) |
| *C08F 271/00* | (2006.01) |

(52) U.S. Cl.
CPC ............. *C08F 126/02* (2013.01); *C02F 5/10* (2013.01); *C02F 5/12* (2013.01); *C08F 8/42* (2013.01); *C08F 130/08* (2013.01); *C02F 1/68* (2013.01); *C02F 2103/02* (2013.01); *C02F 2103/023* (2013.01); *C08F 226/02* (2013.01); *C08F 271/00* (2013.01); *C08L 37/00* (2013.01)

(58) Field of Classification Search
CPC ...... C08F 24/00; C08F 124/00; C08F 224/00; C08L 37/00
See application file for complete search history.

(56) References Cited

U.S. PATENT DOCUMENTS

| | | | |
|---|---|---|---|
| 5,346,628 A | 9/1994 | Sommese et al. | |
| 5,948,268 A * | 9/1999 | Yamaguchi | C02F 1/56 210/701 |
| 7,674,385 B2 * | 3/2010 | Heitner | C02F 5/10 162/DIG. 4 |
| 7,999,065 B2 | 8/2011 | Heitner et al. | |
| 2008/0257827 A1 | 10/2008 | Dai et al. | |
| 2014/0124451 A1 | 5/2014 | Urbani et al. | |
| 2015/0175844 A1 | 6/2015 | Cywar et al. | |
| 2015/0368384 A1 * | 12/2015 | Shibutani | C08F 8/12 524/547 |

FOREIGN PATENT DOCUMENTS

| | | |
|---|---|---|
| WO | 2008/045677 A1 | 4/2008 |
| WO | 2015/015723 A1 | 7/2015 |

OTHER PUBLICATIONS

International Search Report. PCT/US2015/065810, dated Mar. 29, 2016.

* cited by examiner

*Primary Examiner* — Clare M Perrin
(74) *Attorney, Agent, or Firm* — Charles E. Bell, Esq.

(57) ABSTRACT

Silicon containing polyamine scale inhibitors derived from poly(primary amine)s are disclosed. The scale inhibitors can be used to reduce siliceous scale formation in industrial process streams such as alumina recovery process streams, nuclear waste streams and kraft paper mill effluent streams.

13 Claims, No Drawings

SCALE INHIBITOR COMPOSITIONS AND METHODS OF USING

This patent application claims priority to pending patent application 62/092,950 filed on Dec. 17, 2014, incorporated herein in its entirety.

BACKGROUND OF THE INVENTION

Field of the Invention

This invention relates to polymers, compositions, and methods of preventing or reducing siliceous scale formation in an industrial process susceptible to siliceous scale formation.

Description of the Related Art

There are two main processes for recovering alumina from raw bauxite ore, or bauxite; namely, the Bayer process and the sinter process. Alumina recovery processes also include blends of those two processes, as well as modifications of each process.

In both processes, alumina is recovered from raw bauxite ore, or bauxite. The type of recovery process used is determined by the type of bauxite from which the alumina is recovered—lateritic bauxite or karst bauxite. Roughly ninety percent of the world's exploitable bauxite reserves are lateritic, which is easier to digest than karst bauxite and is typically treated by Bayer process variations.

Mineralogically, bauxite is principally composed of aluminum oxide ($Al_2O_3$), commonly referred to as alumina, as well as iron oxide and other impurities, commonly known as "red mud" due to the red color caused by the iron oxide. These additional impurities, present in minor amounts in the ore, include silica, aluminosilicate minerals and organic materials.

The sinter process is an alternative or adjuvant to the Bayer process, and is commonly used for the treatment of high silica-containing bauxites (e.g., karst bauxite). In the sinter process, the bauxite (or "red mud") is calcined at 1200° C. with soda and/or lime prior to leaching with NaOH solution, generating sodium aluminate liquor (also commonly referred to as "supersaturated green liquor") and insoluble "sinter mud".

The Bayer process is the principal method for recovery of alumina from bauxite worldwide. In the Bayer process, milled raw bauxite ore is first heated or digested with a highly caustic solution referred to as the digestion liquor. Digestion liquor generally includes a caustic solution of sodium hydroxide (NaOH) together with spent liquor recycled from the alumina precipitation process. This dissolution process is undertaken at high temperatures in order to fully dissolve all aluminum-bearing minerals, especially alumina trihydrate (gibbsite) and alumina monohydrate (boehmite and/or diaspore), yielding a supersaturated solution of sodium aluminate ($Al(OH)_4^- + Na^+$) or "pregnant liquor". The caustic solution used to dissolve the aluminum minerals can also dissolve part or all of the silica content present in the bauxite, especially silica present in the form of aluminosilicate clays. Further, red mud iron oxides remain undissolved in this digestion liquor and must be removed prior to isolation of the purified alumina.

The resulting concentrations of dissolved materials in the pregnant liquor are very high, with sodium hydroxide concentrations typically being 150 grams/liter ('g/L') or greater, and dissolved alumina 120 g/L or greater. Any remaining undissolved solids are physically separated from the aluminate solution, with one or more polymeric flocculants used to speed removal of fine solid particles. These residual suspended solids are removed during a filtration step.

Once filtered, the clarified pregnant liquor is then cooled and seeded with alumina trihydrate to precipitate a portion of the dissolved alumina in the form of alumina trihydrate ($Al(OH)_3$), which is then isolated by sedimentation and/or filtration before being calcined. After this alumina precipitation step, the remaining low solids solution (also called "spent liquor") is reheated and recycled to the digestion step. During digestion, some of the silicate minerals present in the milled bauxite rapidly dissolve in the caustic solution to form solutions supersaturated with silica. At least part of this dissolved silica then reacts with the sodium aluminate ($Al(OH)_4^-$) present in solution to form insoluble complex hydrated sodium aluminum silicates, generally designated as desilication products, or "DSP". DSP species include sodalite, as well as cancrinite and noselite and are generally referred to as sodium aluminosilicate.

DSP are of low solubility in sodium aluminate liquor and largely precipitate out of solution, thereby removing undesirable silica from the solution. As the alumina-depleted liquor is reheated, the rate of silica precipitation in the form of sodalite increases markedly with increasing temperature due to faster kinetics. This precipitation occurs as scaling on the inside of the heat exchange tubes and significant loss of heat transfer occurs. Besides the obvious cost of maintenance and labor required to clean the scale on the heat exchangers, the impact of scale may also be seen in increased energy consumption, reduced liquor flows, reduced throughput, reduced evaporation, and even reduced production.

In alumina recovery plants that operate a "double stream process", low solids spent liquor recycled from the precipitation step is heated prior to its addition to the bauxite ore in the digestion step. As the spent liquor still contains dissolved aluminate and silicate anions, further processing of this liquor, especially heating, often causes deposition of aluminosilicate scales on the surface of alumina recovery process equipment such as heat exchangers, as noted above.

In alumina recovery plants that operate a "single stream process", fresh bauxite ore is mixed with recycled spent liquor prior to heating on the way to digestion. As such, in single stream processes liquor that is exposed to heat exchanger surfaces also contains red mud solids originating from the freshly charged bauxite. Thus, in single stream processes, the Bayer process stream that is prone to scaling is further contaminated with significant amounts of undissolved red mud solids (i.e., a significantly higher solids content), which markedly reduces the efficacy of prior art scale inhibition processes, such as the double stream process describe above. The amount of undissolved red mud solids present in the heat exchanger liquor in a single stream plant can be as much as 30-150 g/l or more, versus 10 mg/L or less in a low solids double stream process. Thus, there is a need for improved methods of inhibiting scale formation on the surface of Bayer process equipment in single stream plants.

Various anti-scaling agents or scale inhibitors, including ones containing —$Si(OR)_n$ groups, and methods of their use have been developed. One such method is dosing of the silica containing scale inhibitors. In addition to dosing scale inhibitors containing —$Si(OR)_n$ groups, other techniques have included direct addition (bulk dosing) of methyl and ethyl siliconates to alumina recovery process liquor, as well as a variety of other compounds such as ammonium, aromatic amine, amine compounds, polymeric quaternary ammonium compounds, polyamine polymers, copolymers of acrylic acid and acrylamide, and polyacrylamides. Bulk dosing of silica particles and dosing of water-soluble polymers with carboxylic acid groups in Bayer liquor is also known.

Besides bulk dosing, other methods for reduction of aluminosilicate scale in alumina recovery processes are described in US2015/0175844.

Another process teaches pretreatment of surfaces of alumina recovery process equipment with thermosetting epoxy/urethane resins to inhibit scale formation. This coating process involves a curing reaction that is both laborious and time-consuming, and further requires use of a thick layer resin which could compromise heat transfer.

Many of the currently available anti-scaling agents do not work well in the presence of a large amount of suspended solids as found in the single stream Bayer process. In the digestion heaters of the single stream process, the minimum dose of anti-scaling agent (minimum inhibitor concentration, or MIC) added to the process stream to reduce or prevent wall scale increases as the amount of solids in the process stream increases. For streams having a high level (e.g., 10%) of solids, the MIC can be so high that addition of anti-scaling agent becomes impractical and/or uneconomical.

Still, Si-containing polymer antiscalants such as Si-containing polyamine-based antiscalants and methods of using them represent a significant advance in the art in effectively inhibiting scale formation in industrial process streams. Such antiscalants are produced by modifying a conventional polyamine such as a simple diamines eg ethylene diamine, hexamethylene diamine, isophorone diamine, xylene diamine, bis(aminomethyl)cyclohexane, trimethylhexanediamines, or polyamines of higher functionality eg diethylene triamine, tetraethylene pentamine, and polyethylenimine (PEI) with an amine-reactive compound containing silanol or silanol precursor groups. The polyamines of higher functionality are produced by condensation polymerization in which simple diamines are reacted with a difunctional comonomer eg a dihaloalkane. PEI is typically manufactured by ring-opening polymerization of ethyleneimine. Antiscalants based on PEI are currently state-of-the art in the industry but are expensive to manufacture and require the use of a toxic monomer ethyleneimine. It should be noted that all of these prior art antiscalants require the presence of a N group within the backbone of the molecule as this feature hitherto was thought to be essential in this field. Surprisingly, it has now been found that silane modified polyamines which do not contain a N group within the backbone of the molecule are useful scale inhibitors. Unlike the prior art polyamine scale inhibitors, the silane modified polyamines of the instant invention are conventionally made by radical polymerization of a compound containing an amine group or an amine precursor group and a group that is polymerizable by radical initiation such as a vinyl, allyl, acrylamido or acryloyl group. This method of preparation can result in higher molecular weight, use of lower toxicity raw materials, and lower manufacturing costs all of which are highly desirable features.

SUMMARY OF THE INVENTION

Novel functionalized Si-containing polyamines, derived from poly(primary amine)s such as polyvinylamine and polyallylamine, have now been developed to inhibit scale formation in industrial process streams. These poly(primary amine)s can be functionalized with amine-reactive compounds and amine-reactive compounds which also contain silane groups, with the resultant product suitable for use as an anti-scalant in alumina recovery processes.

Accordingly, provided herewith is a scale inhibiting polymer including an A mer according to formula (I):

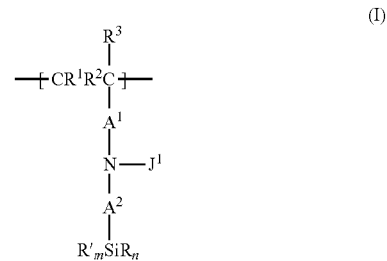

and a B mer according to formula (II):

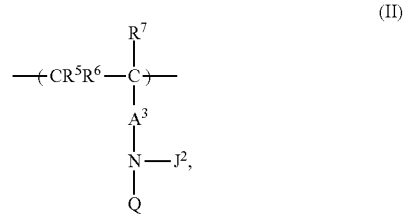

wherein each R is independently hydroxy, optionally substituted $C_{1-20}$ alkoxy, optionally substituted $C_{1-20}$ oxyalkylene, optionally substituted $C_{6-12}$ aryloxy, or —OM; M is a group I metal ion, group II metal ion, or $N(R^4)_4^+$; each R' group is an optionally substituted $C_{1-20}$ alkyl, $C_{6-12}$ aryl, or $C_{7-12}$ aralkyl group; n is 1, 2 or 3 and m is 0, 1 or 2; $R^1$, $R^2$, $R^3$, $R^4$, $R^5$, $R^6$ and $R^7$ are each independently hydrogen or a first optionally substituted hydrocarbyl radical comprising from about 1 to about 20 carbons; $A^1$ and $A^3$ are each independently a direct bond or an optionally substituted hydrocarbyl radical comprising from about 1 to about 20 carbons; $A^2$ is a direct bond or an organic connecting group comprising from about 1 to about 20 carbons; $J^1$ and $J^2$ are each independently H or an optionally substituted hydrocarbyl radical comprising from about 1 to about 20 carbons; and Q is independently hydrogen or a first optionally substituted hydrocarbyl radical comprising from about 1 to about 20 carbons. It has been discovered that such polymers are effective in reducing scale in alumina recovery processes.

Another aspect of this disclosure relates to a polymeric reaction product of a polyamine with a silane compound and with a hydrophobe-containing compound, wherein the silane compound includes a —$SiR'_m R_n$ group and an amine-reactive group, wherein each R is independently hydroxy, optionally substituted $C_{1-20}$ alkoxy, optionally substituted $C_{1-20}$ oxyalkylene, optionally substituted $C_{6-12}$ aryloxy, or —OM; M is a group I metal ion, group II metal ion, or $N(R^4)_4^+$; each R' group is independently an optionally substituted $C_{1-20}$ alkyl, $C_{6-12}$ aryl, or $C_{7-12}$ aralkyl group; and n=1, 2 or 3 and m=0, 1 or 2;

wherein the hydrophobe-containing compound includes an amine-reactive group and at least one optionally substituted hydrocarbyl radical chosen from optionally substituted $C_{1-20}$ alkylene, optionally substituted $C_{7-20}$ aralkyl, and optionally substituted $C_{1-20}$ oxyalkylene; and wherein the polyamine includes a C mer according to formula (III):

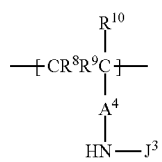

(III)

wherein $R^8$, $R^9$ and $R^{10}$ are each independently hydrogen or $C_{1-6}$ alkyl; $A^4$ is a direct bond or an optionally substituted $C_{1-6}$ alkylene; and $J^3$ is least one optionally substituted hydrocarbyl radical chosen from optionally substituted $C_{1-20}$ alkylene, optionally substituted $C_{7-20}$ aralkyl and optionally substituted $C_{1-20}$ oxyalkylene group.

Also provided herewith is a method of reducing siliceous scale formation in an industrial process that is susceptible to siliceous scale formation, comprising adding a scale-reducing amount of a polymer to an industrial process stream, wherein the polymer comprises an A mer according to formula (I).

The present invention further provides another method for reducing aluminosilicate containing scale in an alumina recovery process. This method includes identifying an alumina recovery process equipment surface that is subject to scale formation during the alumina recovery process. The surface of this process equipment is then contacted with a scale inhibiting composition in an amount effective to form a treated surface that is more resistant to scale formation upon subsequent contact with an alumina recovery process stream than an otherwise comparable untreated surface. The pretreated surface of the equipment is then contacted with the alumina recovery process stream. Suspended solids in the alumina recovery process stream can be present in an amount of about 0.01% to about 60% by weight, based on total weight of the alumina recovery process stream.

DETAILED DESCRIPTION OF THE PREFERRED EMBODIMENTS

Definitions

As used herein, "$C_a$ to $C_b$" or "$C_{a-b}$" in which "a" and "b" are integers refer to the number of carbon atoms in the specified group. That is, the group can contain from "a" to "b", inclusive, carbon atoms. Thus, for example, a "$C_1$ to $C_4$ alkyl" or "$C_{1-4}$ alkyl" group refers to all alkyl groups having from 1 to 4 carbons, that is, $CH_3$—, $CH_3CH_2$—, $CH_3CH_2CH_2$—, $(CH_3)_2CH$—, $CH_3CH_2CH_2CH_2$—, $CH_3CH_2CH(CH_3)$— and $(CH_3)_3C$—.

The term "halogen" or "halo," as used herein, means any one of the stable isotopes of column 7 of the Periodic Table of the Elements (e.g., fluorine, chlorine, bromine, or iodine, with fluorine and chlorine being preferred).

As used herein, "alkyl" refers to a straight or branched hydrocarbon chain that is fully saturated (i.e., contains no double or triple bonds). The alkyl group may have 1 to 20 carbon atoms (whenever it appears herein, a numerical range such as "1 to 20" refers to each integer in the given range; e.g., "1 to 20 carbon atoms" means that the alkyl group may consist of 1 carbon atom, 2 carbon atoms, 3 carbon atoms, etc., up to and including 20 carbon atoms, although the present definition also covers the occurrence of the term "alkyl" where no numerical range is designated). The alkyl group may also be a medium size alkyl having 1 to 9 carbon atoms. The alkyl group could also be a lower alkyl having 1 to 4 carbon atoms. The alkyl group of the compounds may be designated as "$C_{1-4}$ alkyl" or similar designations. By way of example only, "$C_{1-4}$ alkyl" indicates that there are one to four carbon atoms in the alkyl chain (i.e., the alkyl chain is selected from the group consisting of methyl, ethyl, propyl, isopropyl, n-butyl, isobutyl, sec-butyl, and t-butyl). Typical alkyl groups include methyl, ethyl, propyl, isopropyl, butyl, isobutyl, tertiary butyl, pentyl, hexyl, and the like.

As used herein, "alkoxy" refers to the formula —OR wherein R is an alkyl as is defined above, such as "$C_{1-9}$ alkoxy", including but not limited to methoxy, ethoxy, n-propoxy, 1-methylethoxy (isopropoxy), n-butoxy, iso-butoxy, sec-butoxy, and tert-butoxy, and the like.

It is to be understood that certain radical naming conventions can include either a mono-radical or a di-radical, depending on the context. For example, where a substituent requires two points of attachment to the rest of the molecule, it is understood that the substituent is a di-radical. For example, a substituent identified as alkyl that requires two points of attachment includes di-radicals such as —$CH_2$—, —$CH_2CH_2$—, —$CH_2CH(CH_3)CH_2$—, and the like. Other radical naming conventions expressly indicate that the radical is a di-radical such as "alkylene" or "alkenylene".

As used herein, "alkylene" means a branched, or straight chain fully saturated di-radical chemical group containing only carbon and hydrogen that is attached to the rest of the molecule via two points of attachment (i.e., an alkanediyl). The alkylene group may have 1 to 20 carbon atoms, although the present definition also covers the occurrence of the term alkylene where no numerical range is designated. The alkylene group may also be a medium size alkylene having 1 to 9 carbon atoms. The alkylene group could also be a lower alkylene having 1 to 4 carbon atoms. The alkylene group may be designated as "$C_{1-4}$ alkylene" or similar designations. By way of example only, "$C_{1-4}$ alkylene" indicates that there are one to four carbon atoms in the alkylene chain, e.g., the alkylene chain is selected from the group consisting of methylene, ethylene, ethan-1, 1-diyl, propylene, propan-1,1-diyl, propan-2,2-diyl, 1-methyl-ethylene, butylene, butan-1,1-diyl, butan-2,2-diyl, 2-methyl-propan-1,1-diyl, 1-methyl-propylene, 2-methyl-propylene, 1,1-dimethyl-ethylene, 1,2-dimethyl-ethylene, and 1-ethyl-ethylene.

As used herein "halogen functional silane" means a silane compound containing one or more halogen substituents. By way of example only, the halogen functional silane includes but is not limited to ((chloromethyl)phenylethyl)-trimethoxysilane (including both m, p isomers and combinations thereof), (p-chloromethyl)phenyltrimethoxy-silane, chlormethyltriethoxysilane, 3-chloropropyltriethoxysilane, 3-chloropropyltrimethoxysilane, 7-bromoheptyltrimethoxysilane, 3-bromopropyltrimethoxysilane, 11-bromoundecyltrimethoxysilane, 3-iodopropyltrimethoxysilane, 3-(trimethoxysilylpropyl)-2-bromo-2-methylpropionate, chloromethylmethyldiethoxysilane, ((chloromethyl)phenylethyl)-methyldimethoxysilane (including both m, p isomers and combinations thereof), 3-chloropropylmethyldimethoxy-silane, 3-chloroisobutyldimethylmethoxy-silane, chloromethyldimethylethoxysilane, 3-chloropropyldimethylethoxysilane, 2-chloroethyldichlorosilane, chloromethyldimethylchlorosilane, chloromethyltrichlorosilane, 1-trimethoxysilyl-2(p,m-chloromethyl)phenylethane and 3-chloropropyldimethyhnethoxy-silane.

As used herein "epoxy functional silane" means a silane compound containing one or more epoxy substituents. By way of example only, the epoxy functional silane includes but is not limited to 2-(3,4-epoxycyclohexyl)ethyl-triethoxysilane, 2-(3,4-epoxycyclohexyl)ethyl-trimethoxysilane, (3-glycidoxypropyl)trimethoxysilane, (3-glycidoxypropyl)triethoxysilane, 5,6-epoxyhexyltriethoxysilane, (3-glycidoxypropyl)methyldiethoxy-silane, and (3-glycidoxypropyl)dimethylethoxy-silane.

As used herein "isocyanate functional silane" means a silane compound containing one or more isocyanate substituents. By way of example only, the isocyanate functional silane includes but is not limited to 3-isocyanatopropyltriethoxysilane, (isocyanatomethyl)methyldimethoxy-silane, 3-isocyanatopropyltrimethoxy-silane, tris(3-trimethoxysilylpropyl)isocyanurate, (3-triethoxysilylpropyl)-t-butylcarbamate, triethoxysilylpropylethylcarbamate, (isocyanatomethyl)trimethoxysilane, and 3-thiocyanatopropyltriethoxysilane.

The term "amine-reactive group" as used herein refers to a functional group that can react with a primary and/or secondary amine group. Examples of amine reactive group include but are not limited to halogen group, epoxy group, acyl halide group, succinic anhydride group, and/or isocyanate group.

The term "scale reducing amount" as used herein refers to an amount which is effective to significantly reduce the scale formation of the industrial process. For example, a scale reducing amount of a polymer, when used in the industrial process according to the method disclosed herein, can provide a reduction in scale formation of at least 5% in comparison with the industrial process having no polymer added.

Silicon-Containing Polymers

Provided herewith is a polymer comprising an A mer according to formula (I)—

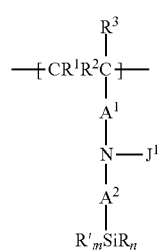

(I)

and a B mer according to formula (II)—

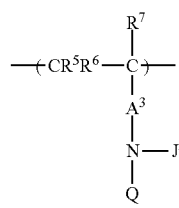

(II)

wherein each R is independently hydroxy, optionally substituted $C_{1-20}$ alkoxy, optionally substituted $C_{1-20}$ oxyalkylene, optionally substituted $C_{6-12}$ aryloxy, or —OM; M is a group I metal ion, group II metal ion, or $N(R^4)_4^+$; each $R^4$ is independently H or a first optionally substituted hydrocarbyl radical comprising from about 1 to about 20 carbons; R' is an optionally substituted $C_{1-20}$ alkyl, $C_{6-20}$ aryl, or $C_{7-20}$ aralkyl group; n=1, 2 or 3; m=0, 1 or 2; $R^1$, $R^2$, $R^3$, $R^5$, $R^6$ and $R^7$ are each independently H or a first optionally substituted hydrocarbyl radical comprising from about 1 to about 20 carbons; $A^1$ and $A^3$ are each independently a direct bond or an optionally substituted hydrocarbyl radical comprising from about 1 to about 20 carbons; $J^1$ and $J^2$ are each independently H or an optionally substituted hydrocarbyl radical comprising from about 1 to about 20 carbons; $A^2$ is a direct bond or an organic connecting group comprising from about 1 to about 20 carbons; and Q is independently H or a first optionally substituted hydrocarbyl radical comprising from about 1 to about 20 carbons.

In certain preferred embodiments, n=3 and m=0. In other preferred embodiments, $J^1$ and $J^2$=H or $CH_3$; $R^1$, $R^2$, $R^3$, $R^5$, $R^6$ and $R^7$ are H; $R^4$ is H or a $C_{1-4}$ alkyl group; and the B-mer consists of both unreacted primary amine groups and hydrophobe-reacted substituted amine groups. In an embodiment, $A^1$ and $A^3$ are each independently a direct bond. In another embodiment, $A^1$ and $A^3$ are each independently an optionally substituted hydrocarbyl radical comprising from about 1 to about 20 carbons. The hydrocarbyl radicals $A^1$ and $A^3$ can be contain one or more heteroatoms such as O, N, and P. Examples of optionally substituted hydrocarbyl radicals include optionally substituted $C_{1-20}$ alkylene or $C_{1-20}$ alkyloxyalkylene groups or optionally substituted $C_{1-20}$ oxyalkylene; —$(CH_2)$—, —$(CH_2)_2$—, —$(CH_2)_3$—, —$(CH_2)_4$—, or —$(CH_2)_5$—; —$(CH_2)_a$—CH(OH)—$(CH_2)_b$—, wherein each of a and b is independently an integer in the range of 0 to 10; —$(CH_2)_a$—CH(OH)—$CH_2$—O—$(CH_2)_b$—, wherein each of a and b is independently an integer in the range of 0 to 10; and —$CH_2$—CH(OH)—$CH_2$—O—$CH_2$—$CH_2$—$CH_2$— groups. In some embodiments $A^1$ and $A^3$ are independently —$CH_2$— groups. In some embodiments, Q is a first optionally substituted hydrocarbyl radical comprising from about 1 to about 20 carbons. In some embodiments Q is a first optionally substituted hydrocarbyl radical comprising from about 3 to about 20 carbons. In some embodiments Q is a first optionally substituted hydrocarbyl radical comprising 3, 4, 5, 6, 7, 8, 9, 10, 11 or 12 carbon atoms.

In some embodiments $A^2$ is an organic connecting group comprising from about 1 to about 20 carbons. The hydrocarbyl radical $A^2$ can contain one or more heteroatoms such as O, N, and P. Examples of organic connecting group $A^2$ include optionally substituted $C_{1-20}$ alkylene or $C_{1-20}$ alkyloxyalkylene groups or optionally substituted $C_{1-20}$ oxyalkylene; —$(CH_2)$—, —$(CH_2)_2$—, —$(CH_2)_3$—, —$(CH_2)_4$—, or —$(CH_2)_5$—; —$(CH_2)_a$—CH(OH)—$(CH_2)_b$—, wherein each of a and b is independently an integer in the range of 0 to 10; —$(CH_2)_a$—CH(OH)—$CH_2$—O—$(CH_2)_b$—, wherein each of a and b is independently an integer in the range of 0 to 10; and —$CH_2$—CH(OH)—$CH_2$—O—$CH_2$—$CH_2$—$CH_2$— groups.

In a preferred embodiment, n=3 and m=0; $J^1$ and $J^2$=H; $R^1$, $R^2$, $R^3$, $R^5$, $R^6$ and $R^7$ are H; $R^4$ is H or a $C_{1-4}$ alkyl group; $A^1$ and $A^3$ are independently —$CH_2$— groups; $A^2$ is a —$CH_2$—CH(OH)—$CH_2$—O—$CH_2$—$CH_2$—$CH_2$— group and Q is a first optionally substituted hydrocarbyl radical comprising from about 1 to about 20 carbons.

In some embodiments M is $Na^+$ or $NH_4^+$ or any combination thereof.

The amount of A mer according to formula (I) in the polymer can vary depending on the amount of other mers in the polymer. Preferably, the amount of A mer according to formula (I) is present in the polymer in an amount of about 1% to about 99% by mole, based on total mers in the polymer; preferably from about 2% to about 50% by mole; more preferably about 5% to about 30% by mole; and even more preferably about 10% to about 20% by mole, based on total mers in the polymer.

The amount of B mer according to formula (II) in the polymer can vary depending on the amount of other mers in the polymer. Preferably, the amount of B mer according to formula (II) is present in the polymer in an amount of about 1% to about 98% by mole; based on total mers in the polymer; more preferably from about 1% to about 91% by mole; more preferably from about 40% to about 91% by mole; and even more preferably from about 40% to about 85% by mole, based on total mers in the polymer.

The polymer described herein can include, in addition to the A mer and B mer, one or more other mers which can make up the remainder of the polymer. The one or more other mers can include a vinylamine mer wherein the amine is an unreacted primary amine. Further, the polymer described herein can include any suitable comonomer known by those skilled in the art.

Silicon-Containing Polymeric Reaction Products

In another aspect a polymeric reaction product of a polyamine with a silane compound and a hydrophobe-containing compound is provided,
wherein the silane compound includes a —$SiR_nR'_m$ group and an amine-reactive group;
wherein each R is independently hydroxy, optionally substituted $C_{1-6}$ alkoxy, or —$OM^a$; $M^a$ is a group I metal ion, a group II metal ion, or $N(R^b)_4^+$; n=1, 2 or 3; m=0, 1 or 2; and each R' group is an optionally substituted $C_{1-20}$ alkyl, $C_{6-12}$ aryl, or $C_{7-12}$ aralkyl group;
wherein the hydrophobe-containing compound includes an amine-reactive group and at least one selected from optionally substituted $C_{1-20}$ alkylene and optionally substituted $C_{1-20}$ oxyalkylene; and
wherein the polyamine includes a C mer according to formula (III)—

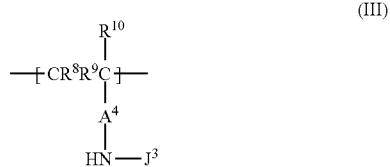

(III)

wherein $R^8$, $R^9$ and $R^{10}$ are each independently H or $C_{1-6}$ alkyl; $A^4$ is a direct bond or an optionally substituted $C_{1-20}$ alkylene, $C_{7-20}$ aralkyl, $C_{6-12}$ aryl or $C_{1-6}$ alkenyl group; and $J^3$ is at least hydrogen or one optionally substituted hydrocarbyl radical chosen from optionally substituted $C_{1-20}$ alkylene, optionally substituted $C_{7-20}$ aralkyl and optionally substituted $C_{1-20}$ oxyalkylene groups.

The hydrophobe-containing compound includes an amine-reactive group but does not contain a —$SiR_nR'_m$ group In an embodiment, $R^8$, $R^9$ and $R^{10}$ are each H; $A^4$ is a —$CH_2$— group or a direct bond; and $J^3$ is H.

Examples of preferred embodiment silane compounds include halogen functional silane, epoxy functional silane, or isocyanate functional silane. Epoxy functional silane compounds include glycidoxypropyl trimethoxysilane and (5,6-epoxyhexyl)triethoxysilane.

Examples of preferred hydrophobe-containing compounds include 1-bromopropane, propylene oxide, butylglycidyl ether, 1,2-epoxydodecane, (2,3-epoxypropyl)benzene, and 1,2-epoxyhexane.

The silicon-containing polymeric reaction product described herein can be a copolymer and contain two or more types of mers. In one embodiment, the polymeric reaction product comprises an A mer according to formula (I) and a B mer according to formula (II). The polymeric reaction product can further include one or more other mers different from the A mer and B mer. For example, the polymeric reaction product can comprises an A mer according to formula (I), a B mer according to formula (II), and a C mer according to formula (III). Other mers can be any suitable comonomer unit known by those skilled in the art. Suitable co-monomers include vinyl acetate, acrylonitrile, styrene, acrylic acid and its esters, acrylamide and substituted acrylamides such as acrylamidomethylpropanesulfonic acid (AMPS).

In some embodiments, the polyamine is a polyvinylamine homopolymer or copolymer or salts thereof with mineral or organic acids for example the hydrochloride or hydrosulfate salts. The polyvinylamine (co)polymer can be prepared by methods known to those skilled in the art. For example, it is convenient to polymerize a vinyl amide monomer such as vinyl formamide or vinyl acetamide with or with additional monomers, to form either a homopolymer or a copolymer of the vinyl amide and then to perform a hydrolysis step whereby the amide group is converted to a primary amine group thus forming the polyvinylamine (co)polymer. Suitable comonomers include (alkyl)acrylamides such as acrylamide, methacrylamide, N,N-dimethylacrylamide, acrylic acid and its salts, methacrylic acid and its salts, acrylamidopropanesulfonic acid and its salts, acrylate esters such as methyl acrylate, methyl methacrylate.

In some embodiments, the polyamine is a polyallylamine homopolymer or copolymer or salts thereof with mineral or organic acids for example the hydrochloride or hydrosulfate salts. For example, it is convenient to polymerize allylamine monomer or salts thereof either with itself to form a homopolymer or with a comonomer such as (alkyl)acrylamides such as acrylamide, methacrylamide, N,N-dimethylacrylamide, acrylic acid and its salts, methacrylic acid and its salts, acrylamidopropanesulfonic acid and its salts, and acrylate esters such as methyl acrylate, methyl methacrylate.

Methods of Manufacture

Polymers described herein can be prepared by polymerization of one or more monomers using a polymerization method known in the art, for example, by radical polymerization or anionic polymerization, using heat, light, electron beam or radiation as polymerization initiation energy. Free radical polymerization is preferred. The silane modified polyamines of the instant invention are conventionally made by radical polymerization of a compound containing an amine group or an amine precursor group eg an amide group and a group that is polymerizable by radical initiation such as vinyl, allyl, acrylamido or acryloyl groups. Any suitable polymerization technique known by those skilled in the art can be used, including but not limited to mass polymerization, solution polymerization, emulsion polymerization, inverse emulsion polymerization, and suspension polymerization. For example, poly(allylamine-HCl) (Mw~10K Da) can be made via radical polymerization of allylamine-HCl using a water-soluble azo-initiator such as 2,2'-Azobis(2-methylpropionamidine)dihydrochloride (commercially available as V-50 from Wako Chemicals USA, Inc., Richmond, Va.). One method of making polyvinylamine (Mw~10K Da) can be Hofmann degradation of polyacrylamide according to A. Achari et al., "Preparation of polyvinylamine from polyacrylamide: a reinvestigation of the Hofmann reaction", *Makromol. Chem.*, vol. 194, pp. 1879-1891 (1993). Also, polyvinylamine (co)polymers and their salts can be prepared by a (co)polymerization/hydrolysis reaction sequence in which it is convenient to polymerize a vinyl amide monomer such as vinyl formamide or vinyl acetamide with or with additional monomers, to form either a homopolymer or a copolymer of the vinyl amide and then to perform a hydrolysis step whereby the amide groups are converted to primary amine groups thus forming the polyvinylamine (co)polymer. Such a process is described in U.S. Pat. No. 4,275,002. In a preferred radical polymerization process, the initiator can be an azo-initiator such as V50 or a redox couple initiator or a combination of both. Redox initiators typically employ an oxidizing component such as a peroxide eg t-buylhydroperoxide or a persulfate such as ammonium persulfate together with a reducing component such as sodium metabisulfite or ferrous ion.

The poly(primary amine) polymers thus produced can then undergo one or more reactions to add one or more functionalities. For example, polyvinylamine and polyallylamine can react with amine-reactive silane compounds and/or amine-reactive hydrophobe compounds to attach silane and/or hydrophobe pendant groups to the poly(primary amine). The amine-reactive hydrophobe compounds do not contain silane groups. Table A provides examples of silane compound (A and B) and hydrophobe-containing compound (C, D, and E).

The functionalization steps described above can be conducted in solution phase with relatively lower viscosities, which can be easily scaled up and operated in manufacturing plants.

Methods of Reducing Siliceous Scale Formation

Polymers and/or polymeric reaction products disclosed herein can be used to reduce or inhibit scale formation in industrial process streams. For example, polymers containing both hydrophobe and silane pendant groups attached to the amine groups can result in higher scale inhibition effects than corresponding polymers having only silane pendant groups attached to the amine groups.

According to one method of reducing siliceous scale formation in an industrial process that is susceptible to siliceous scale formation, comprising adding a scale-reducing amount of a polymer to an industrial process stream, the polymer comprising: an A mer according to formula (I)—

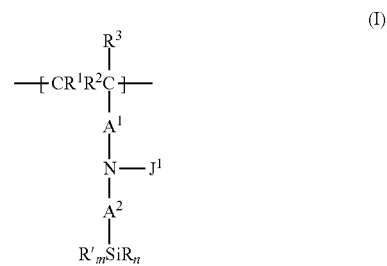

(I)

TABLE A

Examples of silane compounds and hydrophobe-containing compounds

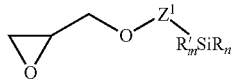

In the above compounds, $Z^1$ and $Z^2$ are each independently a hydrocarbon group having from 1 to 20 carbons; R is independently hydroxy, optionally substituted $C_{1-6}$ alkoxy, or —$OM^a$; $M^a$ is a group I metal ion, a group II metal ion, or $NH_4^+$; R' is an optionally substituted $C_{1-20}$ alkyl, $C_{6-12}$ aryl, or $C_{7-12}$ aralkyl group; n=1, 2 or 3 and m=0, 1, 2; and X is F, Cl, Br, or I. Specific examples of silane compounds include A-1 and B-1. For the hydrophobe-containing compounds, $Z^{2a}$ can be butyl; $Z^{2b}$ can be benzyl, methyl, butyl, or decyl; and $Z^{2c}$ can be propyl or dodecyl.

wherein:
each R is independently hydroxy, optionally substituted $C_{1-20}$ alkoxy, optionally substituted $C_{1-20}$ oxyalkylene, optionally substituted $C_{6-12}$ aryloxy, or —OM;
M is a group I metal ion, group II metal ion, or $N(R^4)_4^+$;
each R' group is an optionally substituted $C_{1-20}$ alkyl, $C_{6-12}$ aryl, or $C_{7-12}$ aralkyl group;
n=1, 2 or 3;
m=0, 1 or 2;
$R^1$, $R^2$, $R^3$ and $R^4$ are each independently H or a first optionally substituted hydrocarbyl radical comprising from about 1 to about 20 carbons;

$A^1$ is a direct bond or an optionally substituted hydrocarbyl radical comprising from about 1 to about 20 carbons;
$J^1$ is H or an optionally substituted hydrocarbyl radical comprising from about 1 to about 20 carbons; and
$A^2$ is a direct bond or an organic connecting group comprising from about 1 to about 20 carbons.

In another embodiment a method of reducing siliceous scale formation in an industrial process that is susceptible to siliceous scale formation, comprising adding a scale-reducing amount of a polymer to an industrial process stream, the polymer comprising: an A mer according to formula (I)—

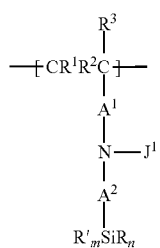

(I)

wherein each R is independently hydroxy, optionally substituted $C_{1-20}$ alkoxy, optionally substituted $C_{1-20}$ oxyalkylene, optionally substituted $C_{6-12}$ aryloxy, or —OM;
M is a group I metal ion, group II metal ion, or $N(R^4)_4^+$;
each R' group is an optionally substituted $C_{1-20}$ alkyl, $C_{6-12}$ aryl, or $C_{7-12}$ aralkyl group;
n=1, 2 or 3; m=0, 1 or 2;
$R^1$, $R^2$, $R^3$ and $R^4$ are each independently H or a first optionally substituted hydrocarbyl radicals comprising from about 1 to about 20 carbons;
$A^1$ is a direct bond or an optionally substituted hydrocarbyl radical comprising from about 1 to about 20 carbons;
$J^1$ is H or an optionally substituted hydrocarbyl radical comprising from about 1 to about 20 carbons; and
$A^2$ is a direct bond or an organic connecting group comprising from about 1 to about 20 carbons and wherein the polymer further comprises a B mer of formula (II):

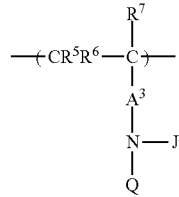

(II)

wherein:
$R^5$, $R^6$ and $R^7$ are each independently H or a first optionally substituted hydrocarbyl radical comprising from about 1 to about 20 carbons;
$A^3$ is a direct bond or an optionally substituted hydrocarbyl radical comprising from about 1 to about 20 carbons;
$J^2$ is H or an optionally substituted hydrocarbyl radical comprising from about 1 to about 20 carbons; and
Q is hydrogen, optionally substituted $C_{1-20}$ alkyl or optionally substituted $C_{1-20}$ oxyalkylene.

In another embodiment, the industrial process stream is a Bayer process stream.

In another embodiment, the polymer is added to a heat exchanger process stream.

In another method of reducing siliceous scale formation in an industrial process, a scale-reducing amount of a polymeric reaction product of a polyamine with a silane compound and with a hydrophobe-containing compound is added to the process stream,
wherein the silane compound comprises a —$SiR_nR'_m$ group and an amine-reactive group;
wherein each R is independently hydroxy, optionally substituted $C_{1-20}$ alkoxy, optionally substituted $C_{1-20}$ oxyalkylene, optionally substituted $C_{6-12}$ aryloxy, or —OM; M is a group I metal ion, a group II metal ion, or $N(R^4)_4^+$; each $R^4$ is independently H or $C_{1-6}$ alkyl; each R' group is an optionally substituted $C_{1-20}$ alkyl, $C_{6-12}$ aryl, or $C_{7-12}$ aralkyl group; and n=1, 2 or 3 and m=0, 1 or 2;
wherein the hydrophobe-containing compound comprises an amine-reactive group and at least one selected from optionally substituted $C_{1-20}$ alkylene and optionally substituted $C_{1-20}$ oxyalkylene; and
wherein the polyamine comprises a C mer according to formula (III)—

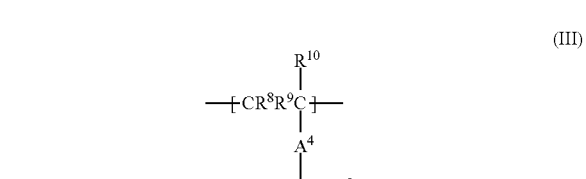

(III)

wherein $R^8$, $R^9$ and $R^{10}$ are each independently hydrogen or $C_{1-6}$ alkyl; $A^4$ is a direct bond or an optionally substituted $C_{1-20}$ alkylene, $C_{7-20}$ aralkyl, $C_{6-12}$ aryl or $C_{1-6}$ alkenyl group; and $J^3$ is at least hydrogen or one optionally substituted hydrocarbyl radical chosen from optionally substituted $C_{1-20}$ alkylene, optionally substituted $C_{7-20}$ aralkyl and optionally substituted $C_{1-20}$ oxyalkylene groups.

In another embodiment the industrial process stream is a Bayer process stream and the polymeric reaction product is added to a heat exchanger.

The polymer and/or composition disclosed herein can be used to reduce siliceous scale formation in an industrial process. The industrial process can be any suitable industrial process known by those skilled in the art to be susceptible to siliceous scale formation. In some embodiments, the industrial process is a Bayer process and the industrial process stream is a Bayer process stream. In some embodiments, the industrial process can be boiler water streams, kraft paper mill effluent streams or nuclear waste process streams.

The amount of polymer and/or polymeric reaction product added to the industrial process stream can depend on the composition of the industrial process stream involved. Generally, routine experimentation can be used to select a scale inhibiting amount thereof. The polymer and/or polymeric reaction product is preferably added to the process stream in a suitable amount known by those skilled in the art. In some embodiments, the scale-reducing amount of the polymer or of the composition added to the industrial process stream is in the range of about 1 part per million (ppm) to about 500 ppm.

Polymers and/or polymeric reaction products disclosed herein can be used to pre-treat the apparatus in which the formation of siliceous scale is to be inhibited before that apparatus is contacted with the industrial process stream. They can also be combined with an industrial process stream leading to the particular apparatus. While the polymer and/or polymeric reaction product can be added to the industrial process stream at any time during the process, preferably it is added before or during the application of heat. For example, the polymer and/or polymeric reaction product can be added immediately before one or more heat exchangers. In the Bayer process, the polymer and/or polymeric reaction product could also be added to the liquor before alumina precipitation or at any other point between the precipitators and the heat exchangers.

The following examples will further describe embodiments of the present invention, and are used for the purposes of illustration only, and should not be considered as limiting.

EXAMPLES

The compositions of Polymers 1A-20A and Polymers 1B-20B are listed in Table 1 after Example 10.

Example 1

Polymer 1A was prepared as follows. 0.300 g poly(vinylamine-HCl) and 0.362 g 50% NaOH were dissolved in 3.355 g water at room temperature, and 0.089 g (3-glycidoxypropyl)trimethoxysilane was added. The mixture was stirred at room temperature for 18 hours to give a 7.5% concentration by weight stock solution.

Polymer 1B was made in the same manner as Polymer 1A, differing in silane content from Polymer 1A.

Polymers 11A and 11B were made in the same manner as Polymer 1A except poly(vinylamine-HCl) was replaced with poly(allylamine-HCl).

Example 2

Polymer 2A was prepared as follows. 0.600 g poly(vinylamine-HCl) and 0.603 g 50% NaOH were dissolved in 7.985 g water at room temperature, and 0.371 g 1-bromopropane was added. The mixture was stirred at 75° C. for 6 hours. Then 4.0 g of the hydrophobe-modified polymer solution was mixed with 0.104 g 25% NaOH in 0.85 g water, and 0.077 g (3-glycidoxypropyl)trimethoxysilane was added. The mixture was stirred at room temperature for 18 hours to give a 7.5% concentration by weight stock solution.

Polymer 2B was made in the same manner as Polymer 2A, differing in silane content from Polymer 2A.

Polymers 12A and 12B were made in the same manner as Polymer 2A except poly(vinylamine-HCl) was replaced with poly(allylamine-HCl).

Example 3

Polymer 3A was prepared as follows. 0.8962 g poly(vinylamine-HCl) and 0.45 g NaOH were dissolved in 45 mL methanol at room temperature, and the mixture was stirred for 18 hours, followed by addition of 1-bromododecane (0.84 g). The mixture was stirred at 50° C. for 48 hours before evaporation of all solvents. 0.662 g of dry dodecyl-modified polyvinylamine residue was mixed with 0.0676 g NaOH in 7.084 g water at room temperature, and 0.089 g (3-glycidoxypropyl)trimethoxysilane was added. The mixture was stirred at room temperature for 18 hours to give a 7.5% concentration by weight stock solution.

Polymer 3B was made in the same manner as Polymer 3A, differing in silane content from Polymer 3A.

Polymers 13A and 13B were made in the same manner as Polymer 3A except poly(vinylamine-HCl) was replaced with poly(allylamine-HCl).

Example 4

Polymer 4A was prepared as follows: 0.400 g poly(vinylamine-HCl) and 0.402 g 50% NaOH were dissolved in 3.713 g water at room temperature, and 0.117 g propylene oxide was added. The mixture was stirred at room temperature for 24 hours. 2.0 g of the hydrophobe-modified polymer solution was then mixed with 0.0362 g 50% NaOH in 0.660 g water, and 0.053 g (3-glycidoxypropyl)trimethoxysilane was added. The mixture was stirred at room temperature for 18 hours to give a 7.5% concentration by weight stock solution.

Polymer 4B was made in the same manner as Polymer 4A, differing in silane content from Polymer 4A.

Polymers 14A and 14B were made in the same manner as Polymer 4A except poly(vinylamine-HCl) was replaced with poly(allylamine-HCl).

Example 5

Polymer 5A was prepared as follows: 0.500 g poly(vinylamine-HCl) and 0.503 g 50% NaOH were dissolved in 3.52 g water and 1.62 g acetonitrile at room temperature, and 0.116 g 1,2-epoxydodecane was added. The mixture was stirred at 75° C. for 8 hours. 2.6 g of the hydrophobe-modified polymer solution was then mixed with 0.0836 g 25% NaOH in 0.219 g water, and 0.062 g (3-glycidoxypropyl)trimethoxysilane was added. The mixture was stirred at room temperature for 18 hours to give a 7.5% concentration by weight stock solution.

Polymer 5B was made in the same manner as Polymer 5A, differing in silane content from Polymer 5A.

Polymers 15A and 15B were made in the same manner as Polymer 5A except poly(vinylamine-HCl) was replaced with poly(allylamine-HCl), and no acetonitrile was used.

Example 6

Polymer 6A was prepared as follows. 0.800 g poly(vinylamine-HCl) and 0.804 g 50% NaOH were dissolved in 6.348 g water at room temperature, and 0.202 g 1,2-epoxyhexane was added. The mixture was stirred at 80° C. for 4 hours. 2.862 g of the hydrophobe-modified polymer solution was then mixed with 0.0536 g 50% NaOH, and 0.0792 g (3-glycidoxypropyl)trimethoxysilane was added. The mixture was stirred at room temperature for 18 hours to give a 9.7% concentration by weight stock solution.

Polymer 6B was made in the same manner as Polymer 6A, differing in silane content from Polymer 6A.

Polymers 16A and 16B were made in the same manner as Polymer 6A except for replacing poly(vinylamine-HCl) with poly(allylamine-HCl).

Example 7

Preparation of Polymer 7A was as follows. 0.500 g poly(vinylamine-HCl) and 0.503 g 50% NaOH were dissolved in 4.168 g water at room temperature, and 0.127 g (2,3-epoxypropyl)benzene was added. The mixture was stirred at 80° C. for 6 hours. 2.0 g of the hydrophobe-modified polymer solution was then mixed with 0.0760 g 25% NaOH in 0.60 g water, and 0.056 g (3-glycidoxypropyl)trimethoxysilane was added. The mixture was stirred at room temperature for 18 hours to give a 7.5% concentration by weight stock solution.

Polymer 7B was made in the same manner as Polymer 7A, differing in silane content from Polymer 7A.

Polymers 17A and 17B were made in the same manner as Polymer 7A except poly(vinylamine-HCl) was replaced with poly(allylamine-HCl).

Example 8

Polymer 8A was prepared as follows. 0.500 g poly(vinylamine-HCl) and 0.503 g 50% NaOH were dissolved in 4.858 g water at room temperature, and 0.164 g butyl glycidyl ether was added. The mixture was stirred at 80° C. for 5 hours. 2.5 g of the hydrophobe-modified polymer solution was then mixed with 0.0868 g 25% NaOH in 0.65 g water, and 0.064 g (3-glycidoxypropyl)trimethoxysilane was added. The mixture was stirred at room temperature for 18 hours to give a 7.5% concentration by weight stock solution.

Polymer 8B was made in the same manner as Polymer 8A, differing in silane content from Polymer 8A.

Polymers 18A and 18B were made in the same manner as Polymer 8A except poly(vinylamine-HCl) was replaced with poly(allylamine-HCl).

Example 9

Polymer 9A was prepared as follows. 0.300 g poly(vinylamine-HCl) and 0.356 g 50% NaOH were dissolved in 2.803 g water at room temperature, and 0.089 g (5,6-epoxyhexyl)triethoxysilane was added. The mixture was stirred at room temperature for 18 hours to give a 7.5% concentration by weight stock solution.

Polymer 9B was made in the same manner as Polymer 9A, differing in silane content from Polymer 9A.

Polymers 19A and 19B were made in the same manner as Polymer 9A except poly(vinylamine-HCl) was replaced with poly(allylamine-HCl).

Example 10

Polymer 10A was prepared as follows. 0.500 g poly(vinylamine-HCl) and 0.502 g 50% NaOH were dissolved in 4.005 g water at room temperature, and 0.094 g 1,2-epoxyhexane was added. The mixture was stirred at 75° C. for 5 hours. 2.0 g of the hydrophobe-modified polymer solution was then mixed with 0.0710 g 25% NaOH in 0.556 g water, and 0.0582 g (5,6-epoxyhexyl)triethoxysilane added. The mixture was stirred at room temperature for 18 hours to give a 7.5% concentration by weight stock solution.

Polymer 10B was made in the same manner as Polymer 10A, differing in silane content from Polymer 10A.

Polymers 20A and 20B were made in the same manner as Polymer 10A except poly(vinylamine-HCl) was replaced with poly(allylamine-HCl).

TABLE 1

Compositions of silicon-containing polymers (percentage of hydrophobe and percentage of silane by mole are calculated based on polyvinylamine recurring unit weight)

| Polymer # | Polymer backbone | Hydrophobe | Silane | Mol % hydrophobe | Mol % silane |
|---|---|---|---|---|---|
| 1A | polyvinylamine | n/a | GPTMS | 0 | 10 |
| 1B | polyvinylamine | n/a | GPTMS | 0 | 20 |
| 2A | polyvinylamine | 1-bromopropane | GPTMS | 40 | 10 |
| 2B | polyvinylamine | 1-bromopropane | GPTMS | 40 | 20 |
| 3A | polyvinylamine | 1-bromododecane | GPTMS | 30 | 10 |
| 3B | polyvinylamine | 1-bromododecane | GPTMS | 30 | 20 |
| 4A | polyvinylamine | propylene oxide | GPTMS | 40 | 10 |
| 4B | polyvinylamine | propylene oxide | GPTMS | 40 | 20 |
| 5A | polyvinylamine | 1,2-epoxydodecane | GPTMS | 10 | 10 |
| 5B | polyvinylamine | 1,2-epoxydodecane | GPTMS | 10 | 20 |
| 6A | polyvinylamine | 1,2-epoxyhexane | GPTMS | 20 | 10 |
| 6B | polyvinylamine | 1,2-epoxyhexane | GPTMS | 20 | 20 |
| 7A | polyvinylamine | (2,3-epoxypropyl)benzene | GPTMS | 15 | 10 |
| 7B | polyvinylamine | (2,3-epoxypropyl)benzene | GPTMS | 15 | 20 |
| 8A | polyvinylamine | butyl glycidyl ether | GPTMS | 20 | 10 |
| 8B | polyvinylamine | butyl glycidyl ether | GPTMS | 20 | 20 |
| 9A | polyvinylamine | n/a | EHTES | 0 | 9 |
| 9B | polyvinylamine | n/a | EHTES | 0 | 12 |
| 10A | polyvinylamine | 1,2-epoxyhexane | EHTES | 15 | 9 |
| 10B | polyvinylamine | 1,2-epoxyhexane | EHTES | 15 | 12 |
| 11A | polyallylamine | n/a | GPTMS | 0 | 10 |
| 11B | polyallylamine | n/a | GPTMS | 0 | 20 |
| 12A | polyallylamine | 1-bromopropane | GPTMS | 40 | 10 |
| 12B | polyallylamine | 1-bromopropane | GPTMS | 40 | 20 |
| 13A | polyallylamine | 1-bromododecane | GPTMS | 5 | 10 |
| 13B | polyallylamine | 1-bromododecane | GPTMS | 5 | 20 |
| 14A | polyallylamine | propylene oxide | GPTMS | 40 | 10 |
| 14B | polyallylamine | propylene oxide | GPTMS | 40 | 20 |
| 15A | polyallylamine | 1,2-epoxydodecane | GPTMS | 1 | 10 |
| 15B | polyallylamine | 1,2-epoxydodecane | GPTMS | 1 | 20 |
| 16A | polyallylamine | 1,2-epoxyhexane | GPTMS | 5 | 10 |
| 16B | polyallylamine | 1,2-epoxyhexane | GPTMS | 5 | 20 |
| 17A | polyallylamine | (2,3-epoxypropyl)benzene | GPTMS | 2 | 10 |
| 17B | polyallylamine | (2,3-epoxypropyl)benzene | GPTMS | 2 | 20 |
| 18A | polyallylamine | butyl glycidyl ether | GPTMS | 10 | 10 |
| 18B | polyallylamine | butyl glycidyl ether | GPTMS | 10 | 20 |
| 19A | polyallylamine | n/a | EHTES | 0 | 9 |
| 19B | polyallylamine | n/a | EHTES | 0 | 12 |
| 20A | polyallylamine | 1,2-epoxyhexane | EHTES | 5 | 9 |
| 20B | polyallylamine | 1,2-epoxyhexane | EHTES | 5 | 12 |

EHTES refers to (5,6-epoxyhexyl)triethoxysilane
GPTMS refers to (3-glycidoxypropyl)trimethoxysilane

Examples 11-30

The polymers listed in Table 1 were used in scaling tests. Synthetic Bayer liquor (SBL) used in the scaling tests contained 45 g/L $Al_2O_3$ (0.441 M), 120.0 g/L NaOH (3.0 M), 60 g/L $Na_2CO_3$ (0.566 M), 20 g/L $Na_2SO_4$ (0.1408 M) and 0.8 g/L $SiO_2$ a total of 245.8 g/L or 24.58% wt/vol, of total dissolved salts. Aliquots of the SBL solution that were placed in the Examples below were also added to the bottle (generally the polymer was added in the form of a solution containing 0.1-10% of active agent) (carbon-steel (grade SA-36) pressure vessels of 42 mL total volume ("bottle") manufactured by the STEM corporation); blank (control) samples were prepared without the polymer. The sealed bottles were heated with agitation at 100° C. for 18±2 hours. At the end of the 18 hours, the bottles were opened and the solution filtered. When no polymer additive was added to the system (blank tests), considerable aluminosilicate formed and recovered on filter paper. Total aluminosilicate precipitated in the blank tests was typically about 200 mg. In the Examples below, the amount of aluminosilicate precipitate is a measure of antiscalant activity and is expressed as a percentage of aluminosilicate that formed in the corresponding blank experiments. Test results of Polymers 1A-10A and 1B-10B are shown in Table 2 below.

TABLE 2

Scaling Test Results of Polymers 1A-10A and 1B-10B

| Example # | Polymer # | % Sodalite Precipitation | | | | |
|---|---|---|---|---|---|---|
| | | Dose 6 (mg/ml) | Dose 8 (mg/ml) | Dose 10 (mg/ml) | Dose 20 (mg/ml) | Dose 40 (mg/ml) |
| 11 | 1A | n/a | n/a | 87.6 | 88.4 | 83.7 |
| 12 | 1B | n/a | n/a | 91.7 | 84.8 | 90.2 |
| 13 | 2A | n/a | n/a | 71.2 | 35.5 | 25.0 |
| 14 | 2B | n/a | n/a | 76.9 | 43.1 | 6.8 |
| 15 | 3A | n/a | n/a | 31.2 | 27.5 | 1.5 |
| 16 | 3B | n/a | n/a | 53.9 | 41.8 | 12.4 |
| 17 | 4A | n/a | n/a | 39.0 | 1.0 | 1.0 |
| 18 | 4B | n/a | n/a | 47.0 | 16.0 | 4.0 |
| 19 | 5A | n/a | n/a | 62.2 | 21.3 | 10.6 |
| 20 | 5B | n/a | n/a | 66.2 | 43.6 | 0.5 |
| 21 | 6A | 1.2 | 0.1 | 0.3 | n/a | n/a |
| 22 | 6B | 0.7 | 0.2 | 0.5 | n/a | n/a |
| 23 | 7A | n/a | n/a | 2.5 | 1.1 | 0.8 |
| 24 | 7B | n/a | n/a | 7.1 | n/a | 0.3 |
| 25 | 8A | n/a | n/a | 2.3 | 1.4 | 1.3 |
| 26 | 8B | n/a | n/a | 2.7 | 1.2 | 1.3 |
| 27 | 9A | n/a | n/a | 95.8 | 91.4 | 96.2 |
| 28 | 9B | n/a | n/a | 97.0 | 89.9 | 83.3 |
| 29 | 10A | n/a | n/a | 59.3 | 18.2 | 1.3 |
| 30 | 10B | n/a | n/a | 54.2 | 19.7 | 1.5 |

The percentage of sodalite precipitation is the amount of sodalite scale precipitated in the polymer-treated samples relative to the average of the blank control samples in which no polymer was added, and indicates the degree of scale formation. Higher percentage of sodalite precipitation means lower ability to prevent the scale formation.

Examples 11-26 demonstrate that the relatively more hydrophobic polyvinylamines (Polymers 2A-8A and 2B-8B) which are functionalized with various hydrophobes and (3-glycidoxypropyl)trimethoxysilane generally provide significantly better reduction in sodalite scale than the control polymers (Polymers 1A and 1B) that are only modified with (3-glycidoxypropyl)trimethoxysilane.

Examples 27-30 show that hydrophobic polyvinylamines (Polymers 10A and 10B) which are functionalized with hydrophobes and (5,6-epoxyhexyl)triethoxysilane also provide significantly better reductions in sodalite scale than the control polymers (Polymers 9A and 9B) that are only modified with (5,6-epoxyhexyl)triethoxysilane.

Scaling tests of Polymers 1A-10A and 1B-10B are summarized in Table 3 below.

TABLE 3

Scaling Test Results of Polymers 11A-20A and 11B-20B

| Example # | Polymer # | % Sodalite Precipitation | | | | |
|---|---|---|---|---|---|---|
| | | Dose 5 (mg/ml) | Dose 10 (mg/ml) | Dose 15 (mg/ml) | Dose 20 (mg/ml) | Dose 40 (mg/ml) |
| 31 | 11A | 89.9 | 82.7 | 85.5 | 78.0 | 73.7 |
| 32 | 11B | 83.5 | 79.5 | 75.5 | 79.3 | 72.4 |
| 33 | 12A | n/a | 94.2 | n/a | 89.2 | 82.6 |
| 34 | 12B | n/a | 31.5 | n/a | 12.1 | 4.6 |
| 35 | 13A | 20.2 | 0.9 | 0.6 | n/a | n/a |
| 36 | 13B | 48.7 | 17.7 | 1.7 | n/a | n/a |
| 37 | 14A | n/a | 2.4 | n/a | 3.0 | 2.5 |
| 38 | 14B | n/a | 2.2 | n/a | 1.8 | 2.4 |
| 39 | 15A | n/a | 73.5 | n/a | 16.5 | 1.6 |
| 40 | 15B | n/a | 79.9 | n/a | 16.3 | 1.6 |
| 41 | 16A | n/a | 1.8 | n/a | 2.2 | 2.2 |
| 42 | 16B | n/a | 3.0 | n/a | 1.7 | 1.6 |
| 43 | 17A | n/a | 18.6 | n/a | 0.3 | 0.9 |
| 44 | 17B | n/a | 36.0 | n/a | 1.6 | 1.6 |
| 45 | 18A | n/a | 1.3 | n/a | 1.2 | 1.3 |
| 46 | 18B | n/a | 1.4 | n/a | 1.6 | 1.6 |
| 47 | 19A | n/a | 76.9 | n/a | 80.6 | 79.8 |
| 48 | 19B | n/a | 49.5 | n/a | 58.4 | 59.0 |
| 49 | 20A | n/a | 3.7 | n/a | 1.1 | 1.2 |
| 50 | 20B | n/a | 10.5 | n/a | 1.2 | 1.5 |

Examples 31-46 illustrate that the relatively more hydrophobic polyallylamines (Polymers 12A-18A and 12B-18B) functionalized with various hydrophobes and (3-glycidoxypropyl)trimethoxysilane generally provide significantly better reduction in sodalite scale than the control polymers (Polymers 11A and 11B) that are only modified with (3-glycidoxypropyl)trimethoxysilane.

Examples 47-50 show that the relatively more hydrophobic polyallylamines (Polymers 20A and 20B) functionalized with hydrophobes and (5,6-epoxyhexyl)triethoxysilane generally provided significantly better reduction in sodalite scale than the control polymers (Polymers 19A and 19B) that are only modified with (5,6-epoxyhexyl)triethoxysilane.

Although the foregoing description has shown, described, and pointed out fundamental novel features of the present teachings, it will be understood that various omissions, substitutions, and changes in the form of the detail of the apparatus as illustrated, as well as the uses thereof, may be made by those skilled in the art without departing from the scope of the present teachings. Consequently, the scope of the present teachings should not be limited to the foregoing discussion, but should be defined by the appended claims.

What is claimed is:

1. A scale inhibiting polymer comprising:
   a polymer backbone functionalized with a hydrophobe-containing compound and a silane compound,
   wherein the polymer backbone is one or more of the group consisting of polyvinyl amine and polyallylamine,
   wherein the hydrophobe-containing compound is one or more of the group consisting of 1-bromopropane, propylene oxide, 1,2-epoxydodecane, 1,2-epoxyhexane, (2,3-epoxypropyl) benzene, butyl gycidyl ether, 1-bromododecane, and the hydrophobe-containing compound is present at 1-40 mol %, and
   wherein the silane compound is one or more of the group consisting of (5,6-epoxyhexyl)triethoxysilane and (3-glycidoxypropyl)trimethoxysilane, and the silane is present at 9-20 mol %.

2. The scale inhibiting polymer of claim 1, wherein the polymer backbone is polyvinyl amine.

3. The scale inhibiting polymer of claim 1, wherein the polymer backbone is polyallylamine.

4. The scale inhibiting polymer of claim 1, wherein the hydrophobe-containing compound is 1-bromopropane.

5. The scale inhibiting polymer of claim 1, wherein the hydrophobe-containing compound is propylene oxide.

6. The scale inhibiting polymer of claim 1, wherein the hydrophobe-containing compound is 1,2-epoxydodecane.

7. The scale inhibiting polymer of claim 1, wherein the hydrophobe-containing compound is 1,2-epoxyhexane.

8. The scale inhibiting polymer of claim 1, wherein the hydrophobe-containing compound is (2,3-epoxypropyl)benzene.

9. The scale inhibiting polymer of claim 1, wherein the hydrophobe-containing compound is butyl glycidyl ether.

10. The scale inhibiting polymer of claim 1, wherein the hydrophobe-containing compound is 1-bromododecane.

11. The scale inhibiting polymer of claim 1, wherein the silane compound is (5,6-epoxyhexyl)triethoxysilane.

12. The scale inhibiting polymer of claim 1, wherein the silane compound is (3-glycidoxylpropyl)trimethoxysilane.

13. A method of reducing siliceous scale formation in an industrial process that is susceptible to siliceous scale formation, comprising adding a scale-reducing amount of a polymer to an industrial process stream, the polymer comprising:
- a polymer backbone functionalized with a hydrophobe-containing compound and a silane compound,
- wherein the polymer backbone is one or more of the group consisting of polyvinyl amine and polyallylamine,
- wherein the hydrophobe-containing compound is one or more of the group consisting of 1-bromopropane, propylene oxide, 1,2-epoxydodecane, 1,2-epoxyhexane, (2,3-epoxypropyl) benzene, butyl glycidyl ether, 1-bromododecane, and the hydrophobe is present at 1-40 mol %, and
- wherein the silane compound is one or more of the group consisting of (5,6-epoxyhexyl)triethoxysilane and (3-glycidoxypropyl)trimethoxysilane, and the silane is present at 9-20 mol %.

* * * * *